United States Patent
Bailey

(10) Patent No.: US 10,125,439 B2
(45) Date of Patent: Nov. 13, 2018

(54) FLEXIBLE TRANSLUCENT TO TRANSPARENT FIREPROOF COMPOSITE MATERIAL

(71) Applicant: Douglas J. Bailey, Grand Island, NY (US)

(72) Inventor: Douglas J. Bailey, Grand Island, NY (US)

(*) Notice: Subject to any disclaimer, the term of this patent is extended or adjusted under 35 U.S.C. 154(b) by 0 days.

(21) Appl. No.: 15/423,287

(22) Filed: Feb. 2, 2017

(65) Prior Publication Data

US 2018/0216268 A1    Aug. 2, 2018

(51) Int. Cl.
| | |
|---|---|
| *D04H 1/593* | (2012.01) |
| *B05D 3/00* | (2006.01) |
| *D06M 17/00* | (2006.01) |
| *D03D 15/12* | (2006.01) |
| *D03D 25/00* | (2006.01) |

(52) U.S. Cl.
CPC ............ *D04H 1/593* (2013.01); *B05D 3/007* (2013.01); *D03D 15/12* (2013.01); *D03D 25/00* (2013.01); *D06M 17/00* (2013.01)

(58) Field of Classification Search
None
See application file for complete search history.

(56) References Cited

U.S. PATENT DOCUMENTS

| | | | |
|---|---|---|---|
| 3,616,839 A | | 11/1971 | Burrin |
| 4,419,402 A | * | 12/1983 | Gutek ................ C08K 3/40 428/429 |
| 4,618,522 A | * | 10/1986 | Modic ................ D06N 3/128 427/387 |
| 4,666,765 A | | 5/1987 | Caldwell et al. |
| 4,714,650 A | * | 12/1987 | Obayashi ............ B32B 25/08 442/93 |
| 5,552,466 A | | 9/1996 | Beckley et al. |
| 7,303,700 B2 | | 12/2007 | Miller |
| 8,097,544 B2 | | 1/2012 | Majors |
| 2005/0142968 A1 | | 6/2005 | Cushing |
| 2010/0093242 A1 | | 4/2010 | Katsoulis |
| 2016/0362563 A1 | * | 12/2016 | Zammarano ........ D06N 3/0063 |

* cited by examiner

*Primary Examiner* — Arti Singh-Pandey
(74) *Attorney, Agent, or Firm* — Vincent G. LoTempio; Kloss, Stenger & LoTempio; David T. Stephenson

(57) ABSTRACT

A fireproof, translucent, flexible coated fabric composite material for use in fire curtains. The composite material meets or exceeds regulatory requirements in terms of fire endurance and allows transmissivity of necessary amounts of light. The process of the present disclosure combines a silica fabric with a special refractory index controlled resin. This unique combination of materials can transform an opaque high temperature fabric into a translucent, and even transparent, composite which as the ability to resist high temperature, flame and smoke penetration that fills a needed gap in technology between visibility and fire resistance in the field of fire and smoke curtains used in civil construction.

15 Claims, 6 Drawing Sheets

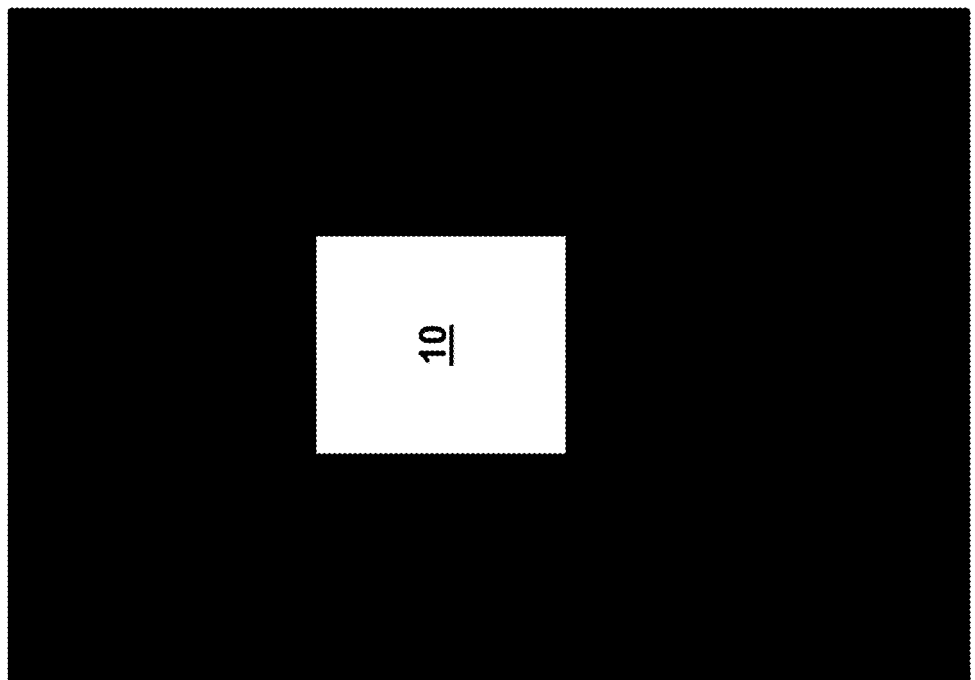

FLEXIBLE TRANSLUCENT TO TRANSPARENT FIREPROOF COMPOSITE MATERIAL

BACKGROUND

The present disclosure generally relates to composite materials and method of manufacture thereof, and more specifically to translucent or transparent composite materials that may be used in civil construction, non-fire penetration, and non-permeability to smoke.

Fireproof curtains or partitions are often used in civil construction settings between rooms and adjacent elevators. Fire curtains do not contain windows, which makes determining whether hazardous conditions exist behind the fire curtain difficult for firefighters. Currently, materials developed for fire and smoke curtains which provide both smoke and flame penetration resistance are not translucent or transparent.

Conventional materials used in fire curtains do not achieve the combination of a desired transmissivity of light, while meeting regulatory requirements in terms of flammability resistance. As such, conventional fire curtains are opaque. In fire and smoke curtain applications, materials such as polyamide and silicone films have been used to eliminate smoke penetration but do not provide adequate protection from flame penetration. Therefore, it is highly desirable that fire curtains have translucent or transparent composite panels comprised of translucent or transparent composite materials that offer protection from high temperature fires.

Existing translucent or transparent composite materials can offer protection from high temperature fires (see U.S. Pat. No. 5,552,466 and U.S. Patent App. Pub. No. 20100093242). However, due to their rigidity and other undesirable properties, these composite materials have not been utilized in fire curtains. Methods for manufacturing rigid translucent or transparent composite materials, which are used in application such as surfboard manufacturing, include combining an opaque, fine fiberglass fabric with a refractory index controlled acrylic resin that matches the refractory index (RI), or refractory index value, of the fiberglass substrate.

For a translucent or transparent composite material to be viable for use in fire curtains, it is necessary that it be flexible. It is also desirable that a flexible, translucent or transparent material be low-cost in terms of manufacture and raw material costs. A translucent or transparent composite panel in a fire curtain must allow transmission of enough visible light to ascertain conditions behind the curtain.

Accordingly, there is a need in the art for a translucent or transparent, flexible fire curtain composite panel which can prevent flame and smoke penetration.

SUMMARY

The present disclosure relates to translucent or transparent, flexible and fireproof coated fabric composite materials for use in fire curtains. The composite material meets or exceeds regulatory requirements in terms of fire endurance and allows transmissivity of necessary amounts of light. The process of the present disclosure combines a silica fabric with a special refractory index controlled resin. This unique combination of materials can transform an opaque high temperature fabric into a translucent, and even transparent, composite which as the ability to resist high temperature, flame and smoke penetration that fills a needed gap in technology between visibility and fire resistance in the field of fire and smoke curtains used in civil construction.

In one embodiment of the present disclosure, the composite may comprise one or more layers of optically controlled silicone resin and high purity silica fabric. The composite material is a three-layer system. In a three-layer system, the impregnated silicone fabric is centered between two layers of optically controlled silicone resin. The preferred manufacturing processes identified for forming the three-layer composite panel is a fabric impregnation process. The composite material may be pre-cut or may then be cut to the shape of the final composite panel.

In the present disclosure, silicone resins are used to treat the fabric sheet. Preferred resins are fabricated from silicone polymers such as polydimethylsiloxane (PDMS) or polysiloxanes. Exemplary polymer compositions include NuSil™ LS6946. The treatment renders the normally opaque fabric translucent to transparent, while enhancing the fire resistance of the coated fabric composite.

BRIEF DESCRIPTION OF THE DRAWINGS

FIG. 6 shows composite panel 10 incorporated into a fire curtain 70.

DETAILED DESCRIPTION

The present disclosure describes various embodiments of a composite panel and method for providing a translucent or transparent, flexible, and fireproof composite material with exceptional fire and smoke resistant properties. Flexibility may be defined herein as the ability to be formed into a roll and extended into a sheet. According to an embodiment the composite panel of the present disclosure is a treated and encapsulated silica fabric. The fabric silica sheet, prior to the treatment of the present disclosure, is opaque, however, after treatment according to the present disclosure, the sheet becomes translucent or transparent.

The present disclosure describes the formation of composite materials that are ideally suited for use as translucent or transparent components for fire curtain composite panels due to their light transmissivity properties and flame retardancy. As one of ordinary skill would recognize, however, the composite materials may be used in other applications not directly related to fire curtains. For example, the composite materials could find usage in other high temperature environments such as industrial ovens and dryers.

The translucent or transparent composite panel of the present disclosure meets regulatory authority certification requirements for fire curtains.

Figure 1:
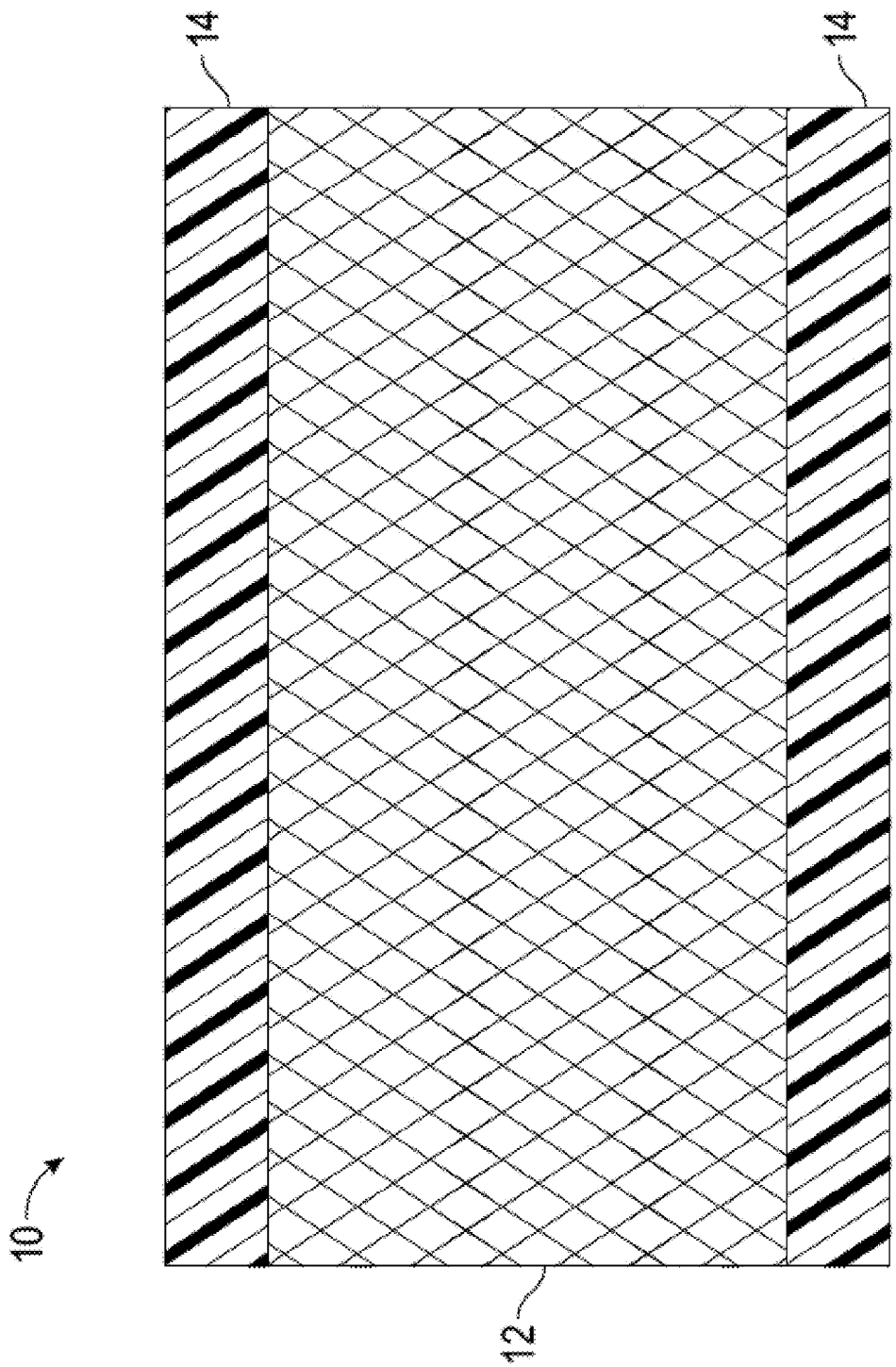
FIG. 1 shows a cross-sectional view of the layers of the composite panel of the present disclosure.

FIG. 1 shows a cross-sectional view of one embodiment the composite panel 10 of the present disclosure. Outer layers of silicone resin 14 surround a layer of composite panel impregnated silica fabric sheet 12. The composite panel impregnated silica fabric sheet 12 is impregnated with the silicone resin that ultimately forms the outer layers of silicone resin 14. Each outer layer is essentially extruded from composite panel impregnated silica fabric sheet 12 during the process of the present disclosure. A basis weight of fabric sheet 32 is preferably between 180 and 600 gsm. Outer layers of silicone resin 14 are generally between 5 and 10 mm wide.

Non-limiting examples of components formed from the composite material of the present disclosure include many fire-related applications such as fire curtains and doors visible light transmitting composite panels.

Figure 2:
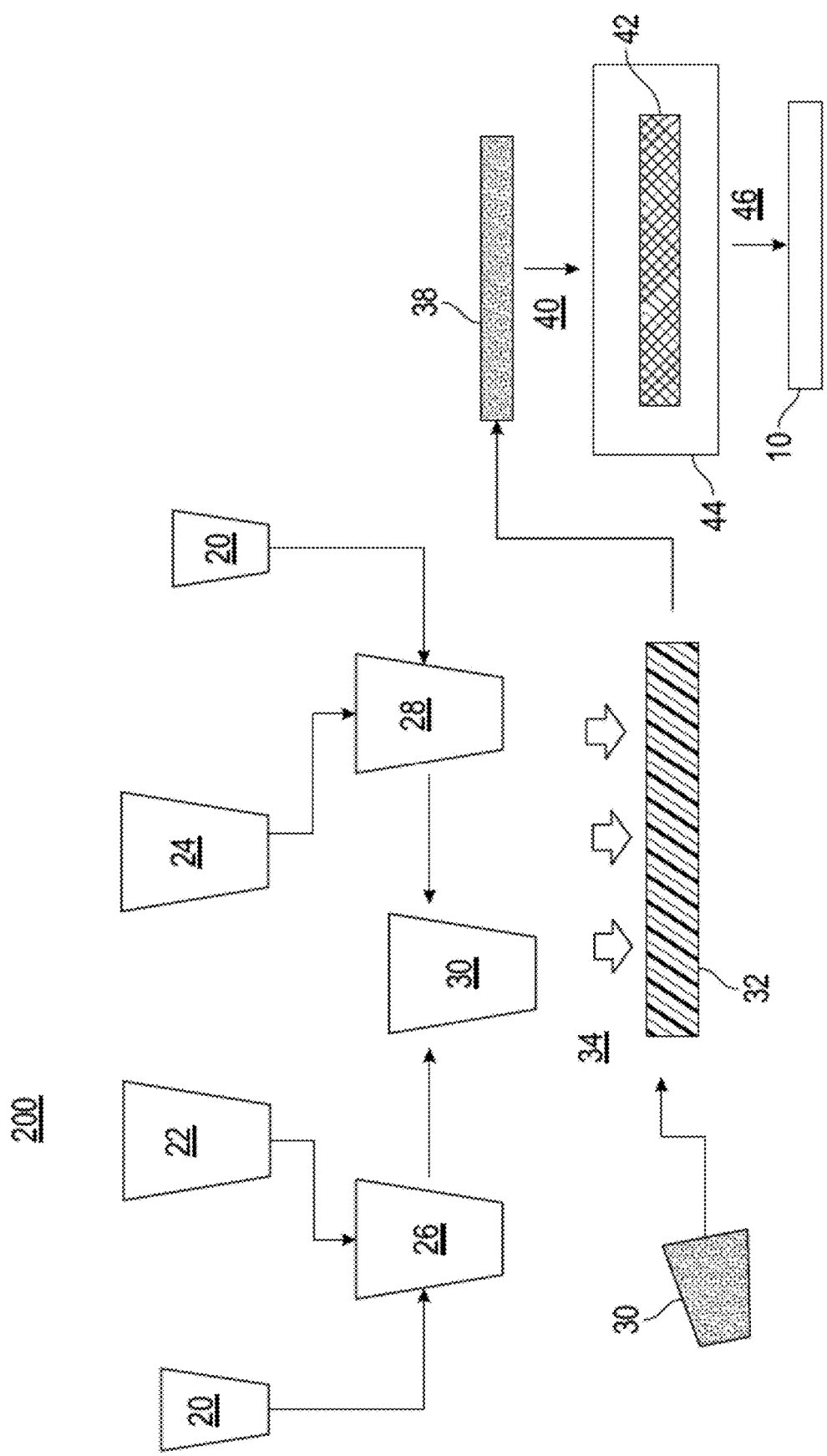
FIG. 2 is a flow diagram of the process of the present disclosure.

FIG. 2 is a flow diagram of the process 200 of the present disclosure. Optical silicone resin is prepared by pre-blending a two-part resin system. The properties of a preferred embodiment of a silicone resin are shown in Table 1. In the process of the present disclosure a first silicone resin 22 is combined with a solvent 20, to form a first dispersant 26. A second silicone resin 24 is combined with the solvent 20 to form a second dispersant 28. In a preferred embodiment, the first silicone resin 22 contains a catalytic ion which is a platinum-based anionic catalyst and the second silicone resin 24 contains a catalytic ion which is a platinum-based cationic catalyst. The silicone resin may be, in a preferred embodiment, NuSil™ LS6946 Optically Clear silicone resin (approximately 30 to 40 gm/sf). The silicone resin is, in the present disclosure, refractory index controlled. Shifts in the resin, depending on the refractive index (RI) value of the fabric, may range from RI of 1.45 to 1.47. Introducing fumed or nano-silica to the resin may optimize translucency. Mixing silica at different levels may increase the refractory index value such that the refractive index value may be 1.41 improved to 1.47 with optimal silica mixture.

The silicone resin should have an optical refractive index value match to the silica fabric sheet, which may be in a range of 1.41 to 1.46. This will vary based on the purity of the silica fabric sheet, with 1.43 being optimized for the preferred 92% silica fabric. For reference, 100% silica would be at 1.40 and a fabric sheet with a silica content of 50% would be optically transparent with a refractory index value of 1.51.

Use of optical silicone with an RI of 1.51 which is typical for fiberglass materials is not effective for the purposes of the present disclosure. The first silicone resin 22 and second silicone resin 24 are preferably NUSIL™ LS6946 resins, which come with a first silicone resin 22 and a second silicone resin 24 pre-blended with platinum-based ionic catalysts. Catalysts comprising a platinum group metal (i.e., platinum, rhodium, ruthenium, palladium, osmium and iridium) or a compound containing a platinum group metal may constitute alternatives to platinum for the purposes of the present disclosure. Inorganic catalysts, as opposed to organic catalysts, are important for the present disclosure due to the need for avoiding smoking or burning of organic compounds during exposure to fire.

The resins used in the present disclosure are of high viscosity, at approximately 50,000 centipoise. NUSIL™ LS6946 resin, and other resins of high viscosity, were initially thought to be unacceptable as they are too viscous to be properly absorbed by a fabric in order to achieve translucency.

The definitions of translucent, opaque and transparent, for the purposes of the present disclosure, are: material which has a total visible light transmission (VLT) of 85% or more is transparent; a VLT above 50% is translucent; and a VLT below 50% is opaque. The translucent sheet produced by the process of the present disclosure has a VLT generally between 65% and 80%, as measured by a set of light meters. The set of light meters referred to herein is the standard means by which VLT is measured, as would be known to one of ordinary skill in the art.

The use of high viscosity resins at initially approximately 50,000 centipoise (cps), or a range between 40,000-60,000 centipoise, is important for the process of the present disclosure. The initial high viscosity is necessary because high percentage of solids present in high viscosity resins are required to impart the desirable final properties to the composite panel. However, for the present disclosure, resins needed to be treated to lower the viscosity for proper wet-out. To achieve proper wet-out, a solvent 20 is added to the initially high viscosity resin. Optimal viscosity for wet-out is between 8,000-10,000 cps, which is critical to the disclosure. Initially lower viscosity silicone resins with the same Refractive Index (RI) as NUSIL™ LS6946 were tested but did not produce acceptable results.

Low viscosity of the resin, when applied to a fabric sheet is critical to composite wet-out, however, starting with lower viscosity material reduces desirable properties necessary for the final product due to the lower percentage solids, thereby necessitating the modifications of the present disclosure. The present disclosure resolves the issue of the initial viscosity being too high by addition of a solvent 20. In a preferred embodiment the solvent 20 is low sulfur xylene, which is important for the process of the present disclosure. Modifying the resin viscosity with low sulfur xylene at the appropriate levels resolved problems with viscosity, however these other solvents had negative impacts on the final product.

Low sulfur xylene is preferably added at a ratio of 4:1 resin to low sulfur xylene, however, the range of 1:1 resin to low sulfur xylene at the low end and 8:1 resin to low sulfur xylene at the high end may produce a functional product. The resin must be modified into the target wet-out range by use of the special clear solvent 20, low sulfur xylene, at the proper dilution ratios and dispersant procedure. Numerous resins at different viscosity were tested to discover the optimal range for the present disclosure. The process of the present disclosure requires the use of silicone resin to produce appropriate fiber-reinforced polymers (FRP) whereas a silicone does not achieve the desired result. The process of the present disclosure includes use of nano-silica functional filler. Nano-silica comes pre-blended with NUSIL LS6946 resin, while other resins could be used and the nano-silica could be added separately.

As shown in FIG. 2, the first dispersant 26 and the second dispersant 28 are combined to form combined silicone resin 30. Use of high viscosity resin and reducing its viscosity to an optimal range by pre-dispersing the two components of the resin in a specifically defined solvent, at a specific blend ratio, under a specifically defined method is critical in the present disclosure.

Combined silicone resin 30 is measured to an appropriate amount for application to a fabric sheet 32, which is comprised of silica. A basis weight of the fabric sheet 32 is preferably between 180 and 600 gsm. The fabric sheet may be leached, which is a known process in the art, however, the present disclosure requires identification of the appropriate starting material for the fabric sheet 32 which will allow it to be leached while maintaining the necessary strength for designated use. The appropriate fabric sheet 32 is an opaque silica fabric of sufficient thickness, weight and strength such that it can be leached to increase silica concentration and still remain strong enough for sufficient fire and pressure resistance, and become translucent or transparent after application of a silicone resin that is refractory index (RI) matched to the fabric. The proper amount of combined silicone resin 30 is dependent on the thickness, density and size of the fabric sheet 32. The combined silicone resin 30 is applied to fabric sheet 32 resulting in impregnation 34 of fabric sheet 32 with combined silicone resin 30. Impregnation 34 with combined silicone resin 30 produces an uncured composite panel 38. Use of a single coat of resin is needed to eliminate the use of blocking film or gel-coat for non-air permeability requirement (UL1784). Gel coats and films are undesirable because they generally will lead to surface burning.

To achieve adequate translucency, the wet-out process is critical, as is matching the refractory index of the combined silicone resin 30 to the refractory index of fabric sheet 32, which is a property resulting from the chemical purity and make-up of fabric sheet 32. Further, the combined silicone resin 30 viscosity is also important, with levels at 5,000 to 15,000 cps, with optimal levels at 8,000 to 10,000 cps.

Shore hardness of the combined silicone resin 30 is also important in order to maintain flexibility of the finished composite panel. Shore hardness of combined silicone resin 30 is optimal between the durometer values of 30 and 60. Viscosity and shore hardness of the combined silicone resin 30 is also critical in the creating the correct physical properties of the present disclosure including puncture resistance and tensile strength, which is also a key factor in the embodiment. Shore hardness can be determined with a durometer, which measures hardness. Hard plastics have high durometer readings and are made from resins with high shore hardness.

Cure condition requirements are important in selecting the first silicone resin 22 and second silicone resin 24. The resins have no flame and smoke producing properties when the composite panel 10 is exposed to high heat conditions. Resins with a UL 94 V-0 rating are desirable.

As shown in FIG. 2, following application of combined silicone resin 30 to fabric sheet 32 is a two stage curing process that involves a soft cure 40 and a hard cure 46. Uncured composite panel 38 is first subjected to a soft cure 40. The soft cure includes deaeration of the uncured composite panel 38 and allows solvent 20 to evaporate. Hard cure 46 involves placing the soft cured composite panel 42 in an oven 44 using baking racks at temperatures of 150 to 300° F. Hard cure 46 eliminates the need for a gel-coat. Lower temperatures for hard curing do not result in the necessary surface, and higher temperatures result in yellowing of the composite panel. The hard cure is a surface cure which gives a monolithic non-tack surface finish. The two-stage cure process provides three critical advantages: solvent evaporation, deaeration prior to hard cure, and elimination of the film or gel-coat resin. After the two-stage cure process composite panel 10 is complete. Composite panel 10 is flexible enough for roll-up, such that composite panel 10 can be rolled into a tube and extended into a sheet.

The process of the present disclosure results in a composite panel 10 of high purity silica. Steps in the process may include leaching a silica fabric sheet 32 in a bath of caustic acid (or otherwise obtaining a leached silica fabric sheet 32), thereby creating a silica fabric sheet 32 of high purity. Leaching increases the silica content of fabric sheet 32 and providing higher thermal stability for fabric sheet 32 and changing the refractory index of fabric sheet 32 while also creating void sights in fabric sheet 32 that enhance impregnation with by combined silicone resin 30.

The refractory index of the fabric sheet 32 is matched to silicone resin. The refractory index of fabric sheet 32 is dependent upon the initial grade of silica fabric sheet 32. Properties of selected high silica fabrics that may be used in the present disclosure are listed in Table 2. Amorphous silica fabric sheet 32 may be purchased, but is frequently between 50-80 percent silicone content. Preferably, fabric sheet 32 is leached to 90-92% silicone for optimal functionality in the present disclosure.

High temperature heat shrinking to pre-shrink fabric sheet 32 is an important step in the present disclosure. Pre-shrinking prevents composite panel 10 from cracking during exposure to a high temperature fire.

The use of the specified type of silicone resin, as described hererin, is critical to the disclosure, as it will provide not only the proper wet-out, but also provides a source of silica particles to assist in stabilization of composite panel 10 at high temperature. Viscosity of the silicone resin and the curing process, as described herein, are critical elements of the present disclosure. The resin may have a UL 94 Vtm=0 rating, but may also have a shore hardness of 30-60, as measured by a durometer, to ensure the composite system remains flexible, while lower shore hardness is suboptimal. Lower shore hardness causes gumminess in composite panel 10. Silicone resin, as disclosed hereinabove, additionally provides puncture resistance in combination with fabric sheet 32 to produce composite panel 10. The present disclosure optimally utilizes a sheet lay-up process to assist not only with the wet-out process, but the cure process as well.

During application of combined silicone resin 30 to fabric sheet 32, combined silicone resin 30 is drawn down in accordance with standard fiberglass reinforced plastic (FRP) procedures. Fabric sheet 32 should have a consistent refractory index, thickness, and weave type such that it will become translucent to transparent when properly matched with a like refractory index resin in a draw down wet-out procedure. Fabric sheet 32 must also be strong enough to avoid breakdown at high temperatures.

Multiple layers of combined silicone resin 30 may be stacked to build composite panel 10 thickness and added strength. Combined silicone resin 30 may be aggressively applied and forced into fabric sheet 32 until wet-out is achieved.

After application of the resin to produce uncured composite panel 38, uncured composite panel 38 is soft cured 40 for deaeration and solvent evaporation. Soft curing can take place at room temperature in an area of low humidity. Following soft cure, hard cure 46 may take place, wherein hard cure 46 involves soft cured composite panel 42 being placed in an oven using baker racks at temperatures between 150 F to 300° F. Resins such as NuSil™ LS6946 form a gas tight surface in the process of the present disclosure which obviates a need for a high temperature film, while still achieving the desired smoke screen as required by UL1784 testing. Optically clear elastomers, such as NuSil™ LS6946 silicone resin, will form a tough, monolithic surface when cured.

Figure 4:
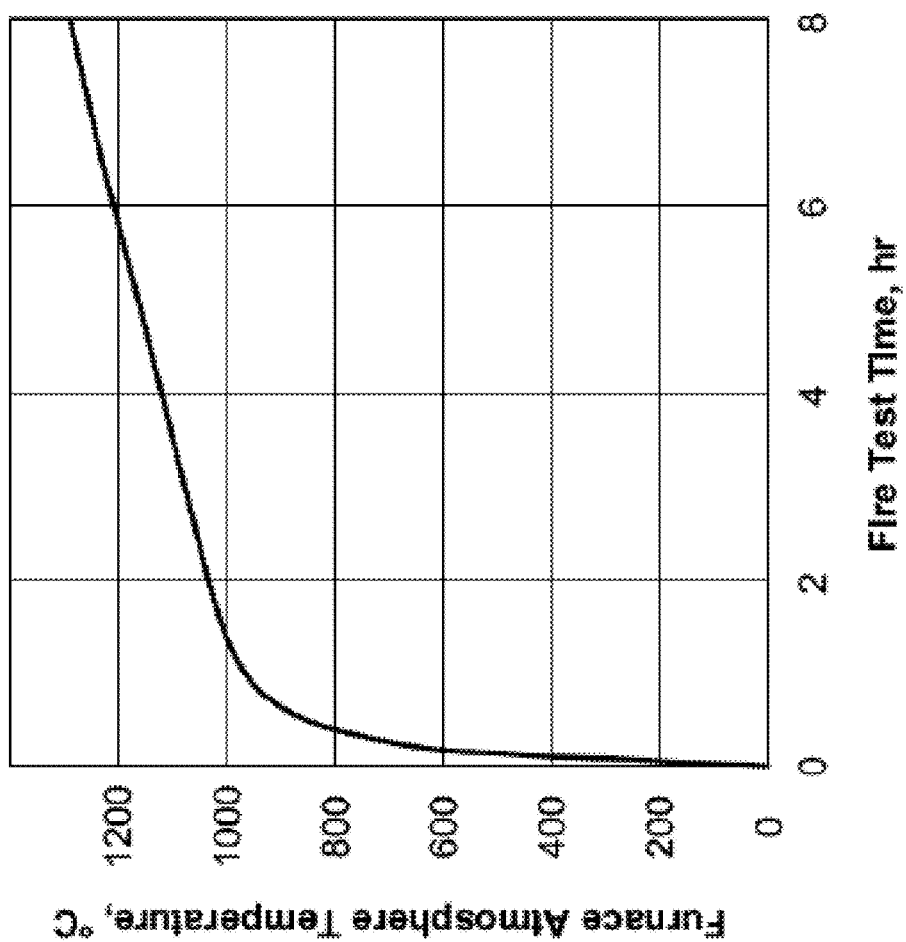
FIG. 4 shows the ASTM E-119 temperature profile for measuring fire endurance.

The resulting composite panel 10 must be strong, and thermally stable, enough to withstand the fire endurance conditions of approximate 2,000° F. for at least 30 minutes, without flame penetration, as required by tests including the UL10D furnace test using the ASTM E-119 temperature profile for fire endurance (shown in FIG. 4). Composite panel 10 of the present disclosure has been demonstrated to withstand fire conditions under the ASTM E-119 temperature profile for fire endurance for over 2 hours, as measured in a full scale test at an internationally recognized fire test lab.

Figure 5:
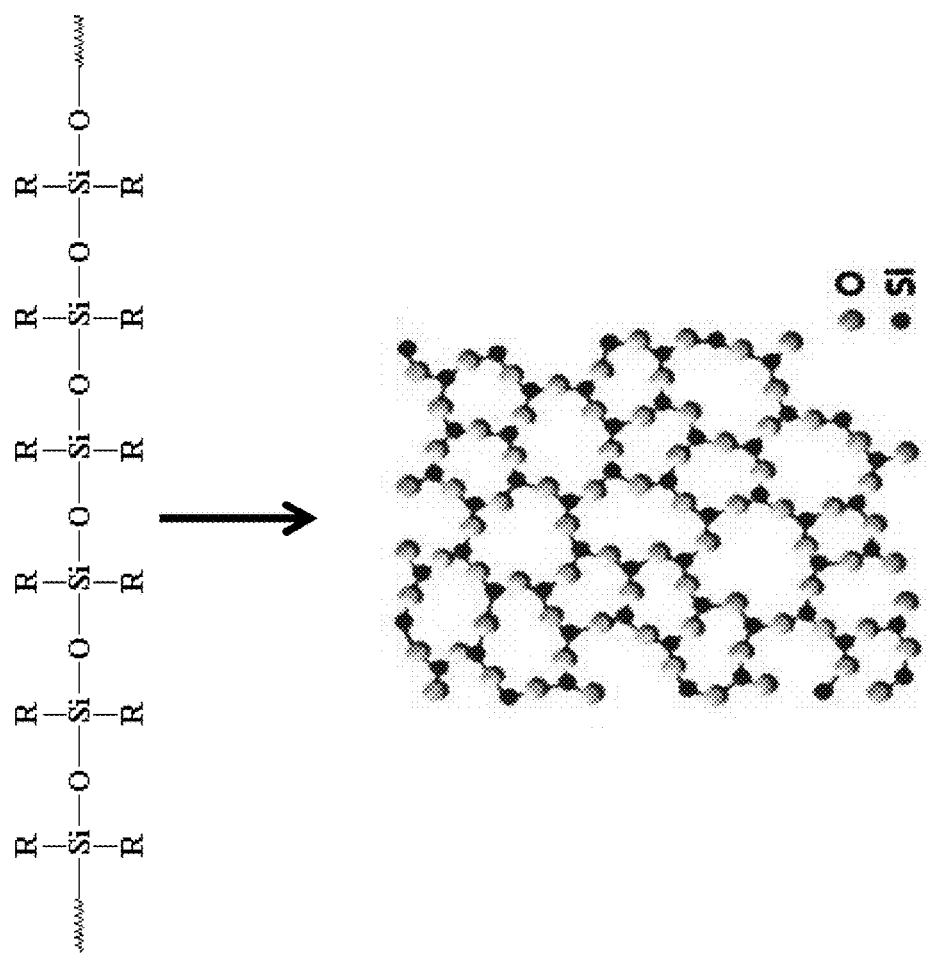
FIG. 5 shows the chemical composition change from polysiloxane to silica resulting from ceramification.

A critical property of composite panel 10 is its ability to form a ceramic. Ceramification is a chemical composition change increasing the silica purity from approximately 92 percent to 97 percent in the present disclosure, a reaction where polysiloxane (silicone) is converted to silica, as generally represented in FIG. 5. Upon exposure to a high temperature fire, ceramification begins at approximately 1100-1200° F. and reaches completion at approximately 1700° F. A high temperature fire is simulated in a controlled setting, for regulatory purposes, by ASTM E-119 temperature profile for measuring fire endurance (shown in FIG. 4). Ceramification of composite panel 10 occurs as a result of the combination of the in situ fire temperature and the high purity silica released from the silicone fabric 414. High purity silica is critical for ceramification.

Recognition that the process of the present disclosure leads to ceramification was a critical step in the present disclosure. Ceramification of the composite panel 10 is an unexpected result, in that it such a result is previously unrecognized and would not be obvious to one of ordinary skill in the art at the time of the invention. The process of the present disclosure is the first to combine a high purity silica fabric sheet 32 and high purity silicone resin and create a fireproof composite panel through ceramification.

During processing, fabric sheet 32 is initially in an amorphous glass phase, and when exposed to extreme heat conditions, fabric sheet 32 will become crystalline, a process referred to as denitrification. However, in the composite panel 10 of the present disclosure, ceramification occurs, which is a change in chemistry, as may be illustrated in a phase diagram known to one of ordinary skill in the art, where the chemical composition of composite panel 10 shifts to a more temperature stable ceramic. Plain weave fabrics, using single end filament yarns are the most adaptable for the process of the present disclosure. Fabric sheet 32 produced by the acid leaching process is ideal, as the leaching removes the sodium (Na) content, which results in a high purity silica chemical $SiO_2$. An additional benefit of the leaching process is that active sights or micro-voids left from the removal of the salt compounds enhance wet-out and provide an ideal receptacle for the silica remains of the silicone resin.

Ceramification, like crystallization, is a product of high temperature; however, the presence of the extremely fine, high surface (highly reactive) silica particles left behind by the silicone once organic material is oxidized results in ceramification. Crystallization of composite panel 10 does occur during exposure to high temperature, which is a change in form from amorphous (liquid glass) to a bonded crystal structure. However, ceramification also occurs in composite panel 10, where ceramification is defined as a chemical composition change, as would be known to one of ordinary skill in the art, which may increase the silica content from 92% to 97%.

Higher silica content in composite panel 10 results in a more thermally stable composition. Under high temperatures, highly reactive silica is released from the silicone and therefore available to the silica fabric before the crystallization occurs.

Figure 3C:
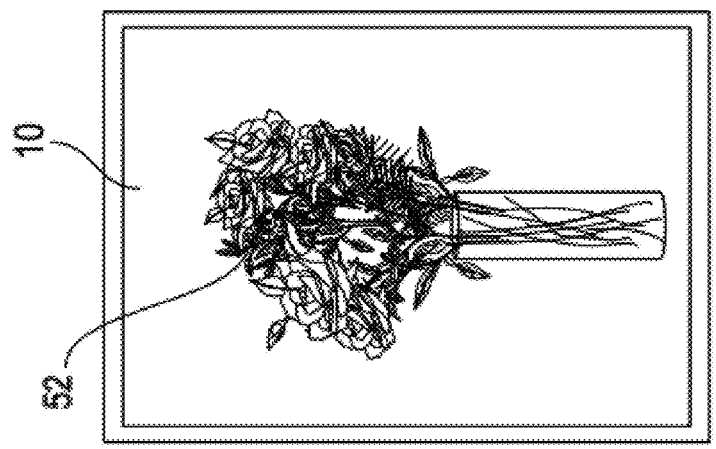
FIG. 3C is a front view of a composite panel created using the process of the present disclosure.
Figure 3B:
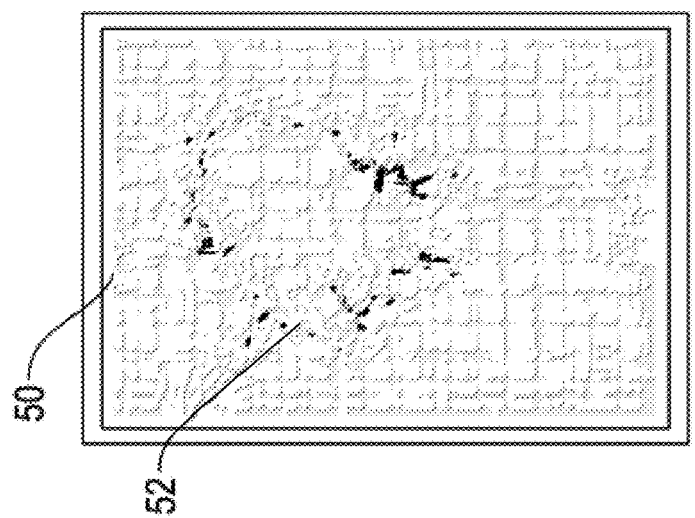
FIG. 3B is a front view of a composite panel treated with an improper resin of outside of the viscosity range of the present disclosure.
Figure 3A:
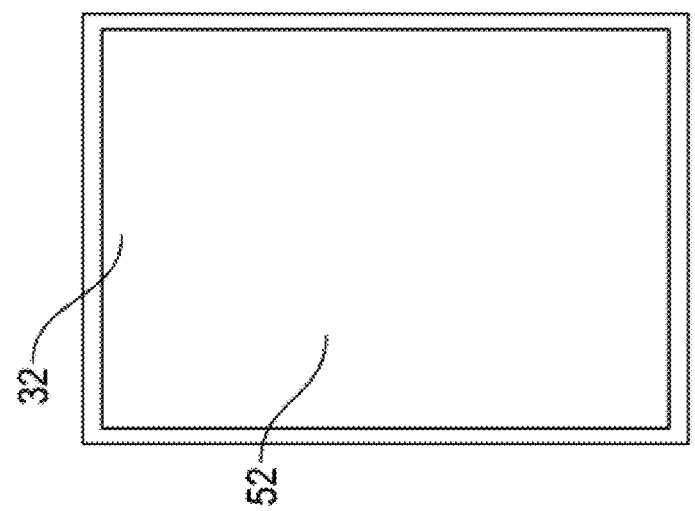
FIG. 3A is a front view of an opaque silica fabric sheet of the present disclosure.

FIGS. 3A-3C illustrate the translucency achieved by the process of the present disclosure. Each figure shows an illustration of an object 52 behind an opaque, semi-opaque or translucent or transparent sheet, to provide a general example of the results of the present disclosure. FIG. 3A includes an opaque fabric sheet 32, prior to treatment by the process of the present disclosure. As shown in FIG. 3A, object 52 is not visible through the fabric sheet 32. FIG. 3B includes a semi-opaque composite panel 50 resulting from a treatment of fabric sheet 32 with an improper viscosity resin. Object 52 is visible only as a vague outline through the improperly treated composite panel. FIG. 3C, however, shows the composite panel 10 of the present disclosure, where object 52 is clearly visible through composite panel 10 of the present disclosure.

FIG. 6 shows composite panel 10 incorporated into a fire curtain 70.

Use of excess resin, which will provide too much organic material, may reduce fireproof properties of composite panel 10. Further, improper deaeration may leave air bubbles entrapped in composite panel 10, thereby reducing bond strength as well as translucency. Additionally, insufficiency of resin will produce poor composite integrity. A curing temperature that is too high may cause frosting and reduce translucency.

An alternative method of producing the composite panel of the present disclosure includes use of vacuums and pressures, applied a thermal press, to eliminate the need for a dispersant.

Composite sheet 10 may have superior performance when translucent rather than when fully transparent, due to the translucent composite sheet 10 having a lower temperature on an exposed side during a high temperature fire. In testing related to the present disclosure, the exposed side temperature was measured for a translucent composite sheet 10 in comparison to a transparent composite sheet 10 under the same conditions, and the translucent composite sheet 10 had a lower temperature than the transparent composite sheet 10 by approximately 20%. Under certain fire conditions and for certain applications, however, a transparent composite sheet 10 may be desirable. For example, translucency has been shown to have some advantages in radiant energy heat transfer.

While preferred embodiments of this disclosure has been described above and shown in the accompanying drawings, it should be understood that applicant does not intend to be limited to the particular details described above and illustrated in the accompanying drawings, but intends to be limited only to the scope of the disclosure as defined by the following claims. In this regard, the term "configured" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

TABLE 1

| Silicone Resin Properties | | | |
|---|---|---|---|
| Optical Control | RI Match | 1.46 | |
| Cure Property | Thermoset | | |
| Appearance | Translucent | | |
| Work Time | 2 hours | | |
| Viscosity | Undispersed | 40,000 | cP typ |
| | After Dispersed | 8-10,000 | cP typ |
| Mix Proerties | Self-deaeration | | |
| Durometer | Type A | 30 | |
| Cure Cycle | Soft Cure/RTV | Variable | |
| | Hard Cure | 150 C. | 30 min |
| Tensile Strength | After Cure | 675 | psi |
| Tear strength | After Cure | 40 | ppi |
| Young Modulus | After Cure | 425 | psi |

TABLE 2

High Silica Fabrics Properties

| Property | | Grade | |
|---|---|---|---|
| | | VS180 | VS300 |
| Weave | | Plain | Plain |
| Finish | Pre-shrink | Heat Treated | Heat Treated |
| Yarn (tex) | Warp | 34 × 3 | 68 × 3 |
| | Weft | 34 × 3 | 68 × 3 |
| Filment Diameter | μ | 6.0 | 6.0 |
| Thickness | mm | 0.25 | 0.45 |
| Weight | g/m2 | 180 | 300 |
| Thread Count | per cm | 10.5 × 10.5 | 9 × 9 |
| Tensile Strength | N/2.5 | 190 × 190 | 300 × 300 |
| Chemical Content | % SiO$_2$ | 95 | 95 |
| | % Al$_2$O$_3$ | 4 | 4 |
| | Other | Less Than 1% | Less Than 1% |

What is claimed is:

1. A flexible composite panel, comprising:
  a silicone resin, wherein the silicone resin has a matching refractory index value of 1.45 to 1.47;
  an impregnated fabric sheet comprised of silica, wherein the impregnated fabric sheet is between approximately 90 to 95 percent silica; wherein a visible light transmission of the flexible composite panel is at least 60 percent as measured by a set of light meters; wherein a shore hardness of the flexible composite panel is in a range of durometer values from 30 to 60; wherein the flexible composite panel has a fire rating of at least 30 minutes in accordance with an ASTM E 119 temperature profile for measuring fire endurance; and wherein the flexible composite panel is flexible such that the flexible composite panel is capable of being rolled into a tube and extended into a sheet.

2. The flexible composite panel of claim 1, wherein the silicone resin is fabricated from at least one silicone polymer including at least one of polydimethylsiloxane and polysiloxane.

3. The flexible composite panel of claim 1, wherein a fabric sheet which is a component of the impregnated fabric sheet is leached to between 90 and 95 percent silica.

4. The flexible composite panel of claim 1, wherein a basis weight of the fabric sheet is between 180 and 600 gsm.

5. The flexible composite panel of claim 1, wherein the flexible composite panel has a monolithic non-tack surface finish.

6. The flexible composite panel of claim 1, wherein the flexible composite panel has a fire rating of at least 2 hours in accordance with an ASTM E 119 temperature profile for measuring fire durance.

7. A flexible composite panel, comprising:
  a silicone resin fabricated from a silicone polymer, wherein the silicone resin has a matching refractory index value of 1.45 to 1.47: wherein the silicone polymer is comprised of at least one of polydimethylsiloxane and polysiloxane; an impregnated fabric sheet comprised of silica impregnated with the silicone resin, wherein prior to impregnation, the fabric sheet is high temperature heat treated to cause shrinking; wherein the impregnated fabric sheet is between approximately 90 and 95 percent silica; wherein a shore hardness of the flexible composite panel is in a range of durometer values from 30 to 60; wherein the basis weight of the fabric sheet is between 180 and 600 gsm; wherein the flexible composite panel has a fire rating of at least 30 minutes in accordance with ASTM E119 temperature profile for measuring fire endurance; wherein a visible light transmission of the flexible composite panel is at least 60 percent as measured by a set of light meters; and wherein the flexible composite panel is flexible such that the flexible composite panel is capable of being rolled into a tube and extended into a sheet.

8. The flexible composite panel of claim 7, wherein the fabric sheet is leached to 90 to 95 percent silica.

9. The flexible composite panel of claim 7, wherein the flexible composite panel has a monolithic non-tack surface finish.

10. A flexible composite panel, comprising:
  a silicone resin, herein the silicone resin has a matching refractory index value of 1.45 to 1.47;
  an impregnated fabric sheet comprised of silica, wherein the impregnated fabric sheet is between approximately 90 to 95 percent silica; wherein a visible light transmission of the flexible composite panel is at least 60 percent as measured by a set of light meters; wherein the flexible composite panel has a fire rating of at least 30 minutes in accordance with an ASTM E 119 temperature profile for measuring fire endurance; and wherein the flexible composite panel is flexible such that the flexible composite panel is capable of being rolled into a tube and extended into a sheet.

11. The flexible composite panel of claim 10, wherein a fabric sheet which is a component of the impregnated fabric sheet is leached to between 90 and 95 percent silica.

12. The flexible composite panel of claim 10, wherein a basis weight of the fabric sheet is between 180 and 600 gsm.

13. The flexible composite panel of claim 10, wherein the flexible composite panel has a monolithic non-tack surface finish.

14. The flexible composite panel of claim 10, wherein the flexible composite panel has a fire rating of at least 2 hours in accordance with an ASTM E 119 temperature profile for measuring fire endurance.

15. The flexible composite panel of claim 10, wherein a shore hardness of the flexible composite panel is in a range of durometer values from 30 to 60.

* * * * *